US007020438B2

(12) United States Patent
Sinivaara et al.

(10) Patent No.: US 7,020,438 B2
(45) Date of Patent: *Mar. 28, 2006

(54) SELECTION OF ACCESS POINT IN A WIRELESS COMMUNICATION SYSTEM

(75) Inventors: Hasse Sinivaara, Espoo (FI); Ari Väisänen, Ruutana (FI)

(73) Assignee: Nokia Corporation, Espoo (FI)

( * ) Notice: Subject to any disclaimer, the term of this patent is extended or adjusted under 35 U.S.C. 154(b) by 441 days.

This patent is subject to a terminal disclaimer.

(21) Appl. No.: 10/338,874

(22) Filed: Jan. 9, 2003

(65) Prior Publication Data

US 2004/0202141 A1 Oct. 14, 2004

(51) Int. Cl.
*H04B 7/00* (2006.01)
*H04Q 7/20* (2006.01)

(52) U.S. Cl. .................... 455/41.2; 370/332; 370/338; 455/436

(58) Field of Classification Search ................ 370/328, 370/329, 331, 332, 338; 455/432.1, 434, 455/436, 437, 450, 453, 41.2; 709/229
See application file for complete search history.

(56) References Cited

U.S. PATENT DOCUMENTS 5,987,062 A 11/1999 Engwer et al. ............. 375/225
6,870,822 B1 * 3/2005 Balogh ...................... 370/332
2001/0024953 A1 9/2001 Balogh .................... 455/432.1
2003/0134642 A1 7/2003 Kostic et al. ............... 455/450

FOREIGN PATENT DOCUMENTS

EP 0912915 4/1999
EP 1 349 412 A2 10/2003

* cited by examiner

*Primary Examiner*—Harry S. Hong
(74) *Attorney, Agent, or Firm*—Squire, Sanders & Dempsey, L.L.P.

(57) ABSTRACT

The invention relates to a method for selecting an access point in a wireless communication system comprising mobile terminals and access points. To enable the mobile terminals to take into account the prevailing conditions within the entire coverage area of an access point more effectively than before, sets of attributes are sent from mobile terminals to the currently serving access point, each set to contain at least one attribute indicating the quality of a wireless link between the serving access point and the sending mobile terminal. Based on the sets, a service report describing current service conditions in the coverage area of the access point is formed and transmitted to at least one mobile terminal. This terminal examines the service report of at least one access point and, based on the examination, selects the access point to which a wireless link is to be established.

19 Claims, 3 Drawing Sheets

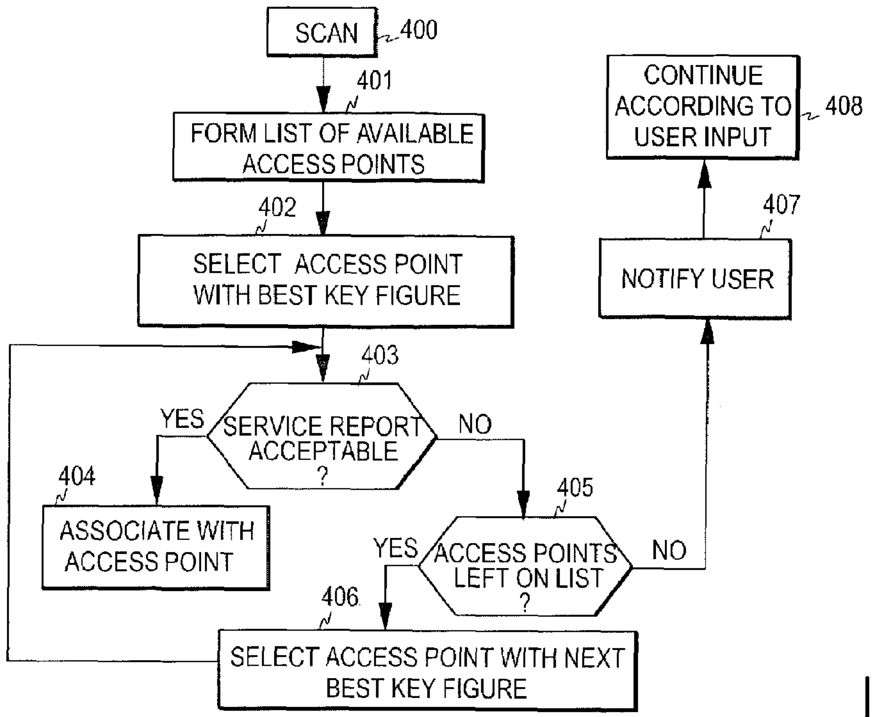
FIG. 4
FIG. 5
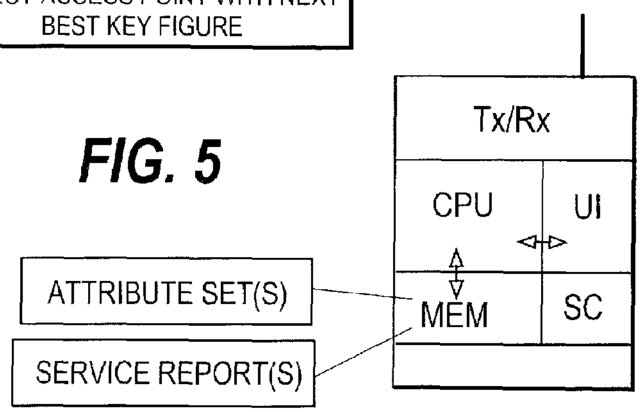
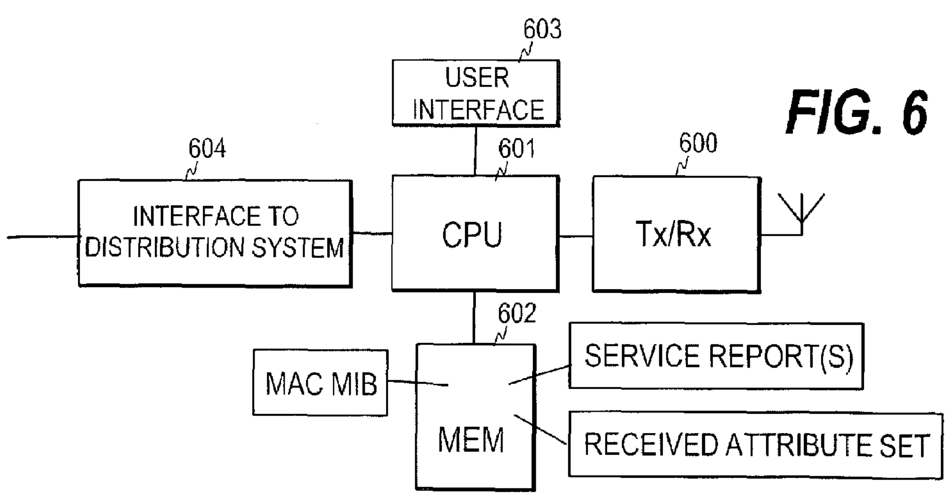
FIG. 6

SELECTION OF ACCESS POINT IN A WIRELESS COMMUNICATION SYSTEM

FIELD OF THE INVENTION

The invention relates generally to the selection of an access point in a wireless communication system providing data services to user-operated terminals. The selection mechanism of the invention can be utilized by a mobile terminal both when joining the network and later, when roaming in the network. The mechanism of the invention therefore also supports mobility in a wireless communication system.

BACKGROUND OF THE INVENTION

The current development towards truly mobile computing and networking has brought on the evolvement of various access technologies which also provide the users with access to the Internet when they are outside their own home network. At present, wireless Internet access is typically based on either wireless LAN (WLAN) technology or mobile networks, or both.

Wireless LAN systems are typically extensions of a wired network, providing mobile users with wireless access to the wired network. In wireless LAN technology, two basic network topologies are available for network configuration: an ad-hoc network and an infrastructure network. An ad-hoc network is formed by two or more independent mobile terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In this type of network, all traffic goes through the access points, regardless of whether the traffic is between two terminals or a terminal and the wired network, i.e. the mobile terminals do not communicate on a peer-to-peer basis. The mobile terminals are provided with wireless LAN cards, whereby they can access the wired network, such as the Internet, through said access points, which are mainly located in various hot spots, such as airports, convention centers, railway stations, or shopping malls.

In order to be able to deliver messages, a mobile terminal must first join the network. In this process, which is commonly termed association, the mobile station associates with one of the access points in its neighborhood. At any given instant, a particular access point, i.e. the one with which the terminal is associated, acts as the serving access point for the mobile terminal.

In the following, typical current implementations of the association procedure are discussed briefly. In the simplest embodiment, the terminal selects the first access point it detects. When the terminal is turned on, it starts to scan the channels available in the geographical area in question and selects the first access point it receives. In a more sophisticated approach, the selection is based on the information obtained from the transmissions of a plurality of access points. The terminal utilizes either active or passive scanning in order to detect the access points in the region. In active scanning, the terminal sends a message called a Probe on each channel. When an access point receives a Probe message, it returns a Probe Response to the terminal. In passive scanning, the terminal finds the network simply by listening for the beacon messages which are periodically broadcast by each access point. Utilizing the above-described active or passive scanning, the terminal scans the channels and examines the information transmitted in the beacon frames or in the Probe Response frames, which contain information about the properties of the access point, such as parameters indicating the security functions of the access point. The terminal determines and stores a parameter termed RSSI (Received Signal Strength Indicator) which indicates the received signal level on the link to the access point. Having finished the scanning process, the terminal selects the access point with the maximum RSSI, provided that the access point fulfills other requirements set by the terminal. In other words, the terminal assumes that as long as the characteristics of the access point are suitable for the terminal, the access point with the best RSSI provides the best quality of service.

Another important attribute of the WLAN networks is the overlapping of the coverage areas, i.e. cells, of the neighboring access points, since the overlap enables seamless roaming between the cells. When a mobile user with a terminal moves beyond the coverage area of the currently serving access point, the terminal must associate itself with a new access point. This process of transferring an established association from one access point to another is commonly termed re-association.

However, the assumption that the access point with the maximum RSSI provides the best quality of service may lead to a situation where an overwhelming majority of the mobile terminals is associated with a few access points, while some of the access points are substantially idle.

Therefore, load sharing mechanisms have been developed, which result in a more uniform load distribution between the access points, i.e. in a more even distribution of the terminals between all access points. Load sharing mechanisms are based on load information sent by the access points in the beacon or Probe Response frames, the load information indicating the current load of the access point. The load information typically indicates the number of terminals currently associated with the access point. The load information is useful especially in areas where the cells overlap or in congested areas requiring a multi-cell structure, i.e. where several access points cover essentially the same area.

The above-mentioned use of load information is disclosed in U.S. Pat. No. 6,469,991, for example. This document discloses a wireless communication system in which the beacon message that is broadcast from an access point includes information about the capabilities of the access point, and possibly also load metric information which generally contains the number of mobile terminals associated with the access point. Based on the information in the beacon message, the wireless terminal chooses the access point with which it wants to associate.

It is further known to transmit various connection attributes from the access points, the selection of the access point being based on the said attributes. International patent application WO01/63842 discloses a method in which the connection is kept in the same network as long as possible. The terminal receives the said attributes from several networks and selects two access points: a first access point, which has the best connection attributes in the network that is the network of the currently serving access point and a second access point, which has the best connection attributes in another network than the network of the currently serving access point. The terminal compares one or more connection attributes of the first and second access points and then re-associates with the second access point if the difference between the connection attributes of the two access points fulfills predetermined criteria. In this way, the connection can be kept in the serving network as long as possible.

However, this method is for roaming use only as it requires that the terminal already has a serving access point before the method can be initiated.

Generally, a major drawback relating to the above-described known methods for joining the network and re-associating with an access point is that the decision on the correct access point can only be made on the basis of the fixed capabilities and the current load of the access points available for the mobile terminal. Therefore, a number of factors possibly affecting the quality of service within the area of the cell cannot be taken into account when selecting the access point. One such factor is the interference caused by external sources. Possible interference sources in a WLAN environment are Bluetooth devices, for example, which operate on the same frequency band (2.4 GHz) as many WLAN systems, and also other WLAN systems operating independently in the neighborhood. The interference level may also rise if the internal channel separation in the WLAN system is smaller than the optimum 25 MHz.

Furthermore, since the present WLAN networks rely on absolute values of the attributes, such as the load of the access point or the signal level of the serving link, short-time deviations from the overall level of service in the cell may cause undesirable association or re-association decisions. For example, a short-time silent period on a channel or a short-time drop in the load level of the access point may cause such decisions.

The objective of the present invention is to alleviate or eliminate the above-mentioned drawbacks.

SUMMARY OF THE INVENTION

The objective of the invention is to devise a new mechanism for selection of an access point in a wireless communication system, allowing the mobile terminal to take into account the prevailing conditions within the entire cell more effectively than before.

In the present invention, a group of mobile terminals in a cell utilize predetermined attributes which give an indication of the quality of service (QoS) currently experienced by the terminal, by collecting a set of such attributes and sending the set to the serving access point. The serving access point processes the attribute sets received from the mobile terminals and compiles a cell report on the basis of the sets. The cell report indicates the current overall quality of service in the cell. For this reason, the cell report is also called a service report in this context.

The service report is then transmitted so that each mobile terminal in the neighborhood, which is about to select an access point, may receive it. As the neighboring access points send their service reports, these terminals typically receive service reports from several access points. Each of these terminals examines the service report of at least one access point and, based on the examination, selects the access point to which a wireless link is to be established. The examination of the report(s) prevents the terminal from making an incorrect decision.

Thus one aspect of the invention is the provision of a method for selecting an access point in a wireless communication system comprising mobile terminals and access points, each access point being capable of serving the mobile terminals within a service area of the access point, the method comprising the steps of:

sending at least one set of attributes from a first group of mobile terminals to the access point currently serving said group of mobile terminals, each of said mobile terminals sending a set that contains at least one attribute indicating the quality of a wireless link between the serving access point and the mobile terminal;

based on the sets, forming a service report describing current service conditions in the service area of the access point;

transmitting the service report to a second group of mobile terminals;

in a mobile terminal belonging to said second group, examining at least one service report received; and in response to the examining step, selecting the access point to which a wireless link is to be established from said mobile terminal.

In one embodiment of the invention, the attributes that form the set are existing attributes retrieved from the management information base within the MAC layer of the mobile terminal.

In a further aspect the invention provides a wireless communication system comprising mobile terminals and access points, each access point being capable of serving the mobile terminals within a service area of the access point, the system comprising:

reception means for receiving at least one set of attributes from a first group of mobile terminals, at least one of the attributes to indicate the quality of a wireless link between a particular mobile station and the access point serving said mobile station;

processing means for forming, based on the sets, a service report describing current service conditions in the service area of the access point;

transmission means for transmitting the service report to a second group of mobile terminals; and in each of the mobile terminals in said second group, (a) examination means for examining a service report received and (b) selection means, responsive to the examination means, for selecting the access point with which a wireless link is to be established.

In another aspect the invention provides an access point for a wireless communication system, the access point comprising:

interface means for connecting the access point to a distribution system;

a transceiver for communicating wirelessly with mobile terminals located within a service area of the access point, said transceiver being adapted to receive sets of attributes from the mobile terminals, at least one of the attributes to indicate the quality of a wireless link between the serving access point and the respective mobile terminal;

processing means for forming, based on the sets, a service report describing current service conditions in the service area of the access point;

wherein the transceiver is further adapted to transmit the service report to at least one mobile terminal.

In a still further aspect the invention provides a mobile terminal for a wireless communication system, the mobile terminal comprising:

a transceiver for communicating with an access point of the wireless communication system via a wireless link;

memory means for storing attributes relating to said link;

collection means for collecting service reports from available access points, each service report describing current service conditions within a service area of a particular access point;

examination means for examining the service report received by the mobile terminal;

selection means, responsive to the examination means, for selecting the access point; and access means for establishing a wireless link with the access point selected.

The selection of the access point may be made when joining the network, as the other terminals already joined to the network have provided the access point with the attribute sets. The selection may be also be made in connection with roaming, whereby the terminal may itself have transmitted sets to the serving access point. However, a terminal making a re-association decision may be another terminal than those providing the access point with the attribute sets. In one embodiment of the invention, the reporting terminals are laptop computers which have a higher battery capacity than smaller terminals, such as intelligent phones.

The mechanism of the invention adds intelligence to the selection process. Therefore, the terminals are capable of avoiding cells where one or more factors, such as an external interference source, degrades the quality of service.

Furthermore, short-time deviations from a more stable long-time situation of the cell can no longer cause erroneous association or re-association decisions as easily as before.

Other features and advantages of the invention will become apparent through reference to the following detailed description and accompanying drawings.

BRIEF DESCRIPTION OF THE DRAWINGS

In the following, the invention and its preferred embodiments are described more closely with reference to the examples shown in FIG. 1 to 6 in the appended drawings, wherein:

FIG. 4 is a flow chart illustrating the selection of the access point when a mobile terminal joins the network, FIG. 5 is a block diagram illustrating the terminal elements in view of the invention, and FIG. 6 is a block diagram illustrating the elements of an access point.

DETAILED DESCRIPTION OF THE INVENTION

As mentioned above, the system of the invention is preferably based on the IEEE 802.11 standard for wireless local area networking. Furthermore, the wireless network according to the invention operates in the infrastructure mode, i.e. it comprises base stations which forward service requests from the mobile terminals to the fixed network and transfer the services provided by the fixed network to the mobile terminals. The base stations are commonly termed access points.

Figure 1:
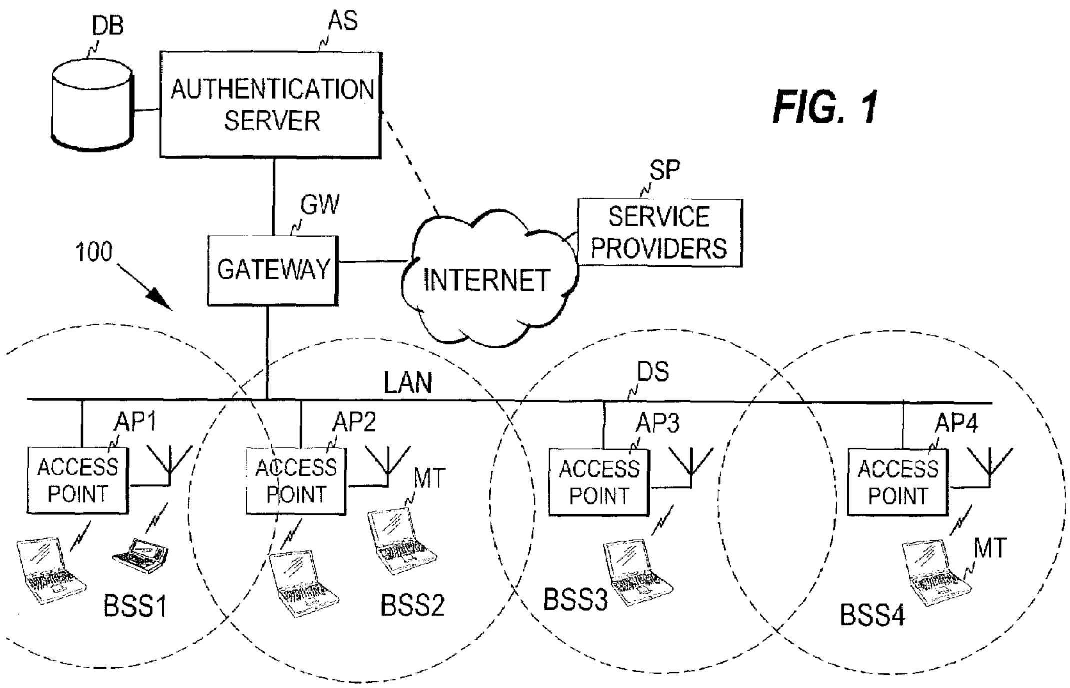
FIG. 1 illustrates a typical communication system according to the invention.

FIG. 1 illustrates a typical communication system according to the invention. The system includes one or more WLAN networks, each connected by means of a gateway GW (a router) to another network, such as the Internet, which contains service providers SP. As indicated above, each WLAN network comprises one or more access points, each communicating wirelessly with the terminals within the coverage area, i.e. the cell, of the access point and thus forming a bridge between the terminals and the wired network. In this context, the coverage area is also called the service area.

It is assumed here that the WLAN network 100 shown in the figure comprises four access points AP1 to AP4. In this type of network (i.e. in an infrastructure network) an access point and at least one terminal is said to form a Basic Serving Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network., or a combination of these two. As the invention does not relate to the architecture of the Distribution System, it is not discussed in more detail here.

Users moving in the area of the WLAN network may use portable computers, PDA equipment, intelligent phones or other such mobile terminals MT. In the same way as an ordinary GSM telephone, the terminals can be made up of two parts: the actual subscriber device, e.g. a portable computer (with software), and a SIM (Subscriber Identity Module), whereby from the viewpoint of the network the subscriber device becomes a functioning terminal only when the SIM has been inserted into it. The SIM may be the subscriber identity module for use in the GSM network or in the UMTS, for example. In the latter case it is termed the USIM (Universal Services Identity Module). However, the terminals may equally well be traditional WLAN terminals in which no SIM is used.

The system further typically contains an authentication server AS of the WLAN network. The authentication server is connected to the above-mentioned gateway through a secured connection, which is typically a TCP/IP connection established through operator network or through the Internet.

Since the present invention concerns the cooperation of the mobile terminals and the access points, the structure of the system is not discussed any further. As is known, the IEEE standard 802.11 defines the physical layer options and the MAC (Media Access Control) layer protocol for the wireless LAN. Since the system of the present invention is compatible with these definitions, they are not discussed in more detail here. An interested reader may find a lot of literature describing the overall structure and function of a WLAN network. Reference is also made to the above-mentioned WO-publication WO01/63842 which contains a brief description of a WLAN network according to the IEEE 802.11 standard.

Figure 2A:
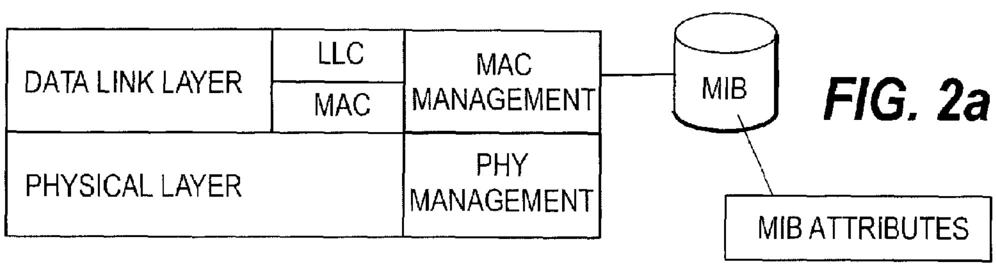
FIG. 2*a* illustrates the MAC entity utilized in the present invention.

In the present invention, the properties of the MAC layer are utilized in a new way. FIG. 2*a* illustrates the protocol architecture of the IEEE 802.11 standard. As shown in the figure, the actual media access control (MAC) protocol operates in the lower sub-layer of the second layer of the OSI layer model which is the Data Link Layer (DLL). The MAC management layer supports the association and roaming functionalities and it further controls the authentication and encryption mechanisms, synchronization of the terminals and power saving functions, for example. The MAC management layer further maintains a MAC layer management database, i.e. the MIB (Management Information Base) of the MAC layer. The MAC layer cooperates with the physical management layer to maintain the database. In the present invention, the content of this database is utilized to provide the terminals with an intelligent mechanism for selecting an access point during the joining or re-association process.

The MAC layer MIB includes various parameters or attributes that are utilized in the present invention. In other words, the present invention utilizes existing attributes of the MAC layer MIB, which the MAC layer protocol also utilizes. These attributes give an indication of the quality of the link between the access point and the mobile terminal. Examples of the MAC layer attributes which can be utilized in the present invention are:

RSSI (Received Signal Strength Indicator), which indicates the level of the received signal.

NF (Noise Floor), which indicates the interference level on the link.

TxRetry and RxRetry, which indicate the amount of re-transmissions and re-receptions, respectively, performed on the link. TxRetry from the point of view of the terminal corresponds to the TxRetry from the point of view of the access point.

DR (Data Rate), which indicates the degree of throughput on the link.

ACK (Acknowledgment). An acknowledgement is sent when a packet is transmitted successfully.

ARQ (Automatic repeat request). An automatic repeat request is sent when a packet is lost.

Back-off window, which indicates the amount of time that the terminal waits for its turn to access the media.

Further attributes which can be utilized are:

CCA (Clear Channel Assessment) which indicates when the media is busy or free.

RATE, which indicates the basic rates at which the terminal transmits. If the lower basic rates are used frequently, it indicates that the quality of the link has dropped (due to a long link span or due to interferences).

In the present invention, a mobile terminal associated with an access point retrieves selected attributes from its MAC layer MIB and forms a set of the attributes. The set may be in the form of a list or table, for example. The terminal stores the set and further forwards it to the serving access point. The desired attributes can be retrieved by means of normal get commands used to retrieve information from the MIB.

In one embodiment of the invention, the MIB attributes are used as such, which requires minimum changes in the terminal. In this case, the mobile terminal only has to retrieve from the MIB the attributes to be utilized and form the set to be transmitted. However, it is also possible that the terminal processes at least some of the attributes. The terminal may, for example, examine selected attributes periodically and produce a new variable from each attribute, such as the average of an attribute.

Figure 2B:
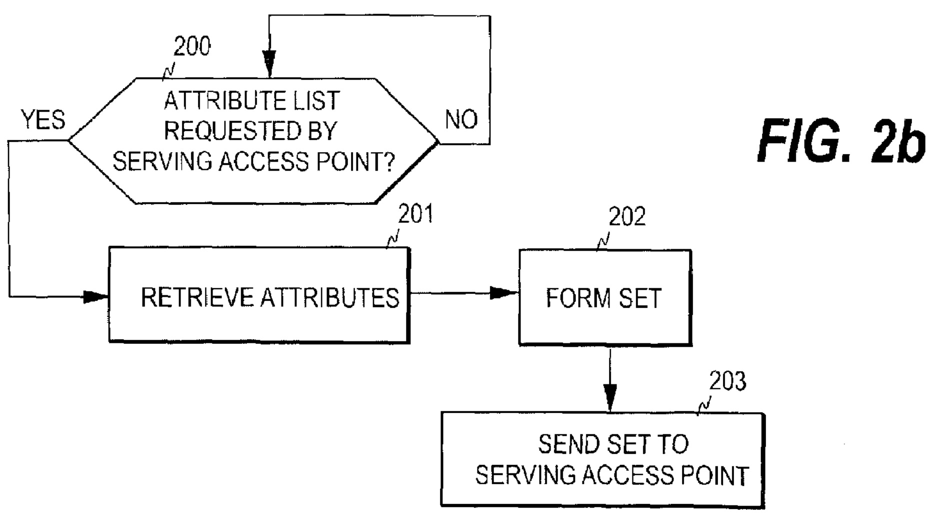
FIG. 2*b* is a flow chart illustrating the operation of a reporting mobile terminal in one embodiment of the invention.
Figure 2C:
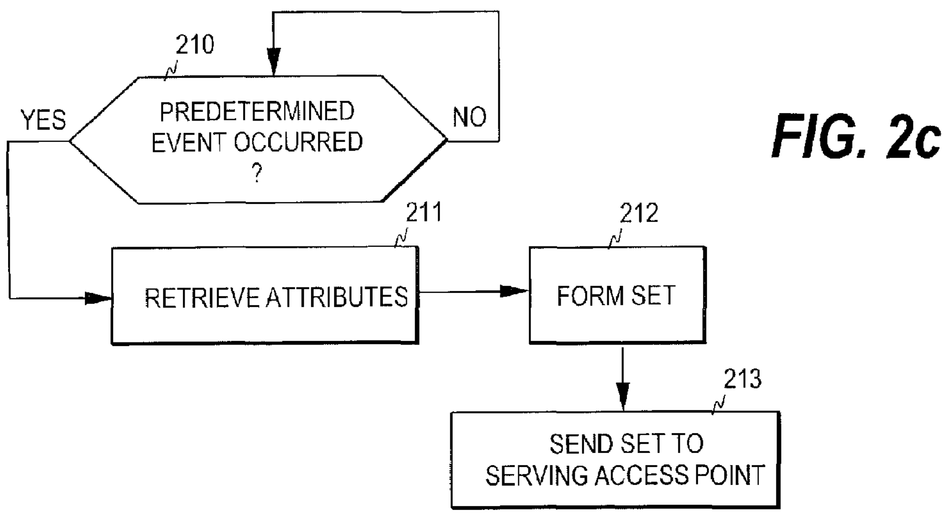
FIG. 2*c* is a flow chart illustrating the operation of a reporting mobile terminal in another embodiment of the invention.

The mobile terminal may send the attribute set periodically or upon a request received from the access point, or both. FIG. 2*b* illustrates the operation of a reporting terminal in the case where the serving access point polls the terminals for the sets. In this case, the terminal monitors for a request sent by the serving access point (step 200) and generates (or updates) and sends the set only when a request to send the set is received from the serving access point (steps 201 to 203). However, the terminal may also send the attribute set without a request from the access point. This kind of embodiment is illustrated in FIG. 2*c*. As shown in the figure, the attribute set may be sent in response to a specified event, such as a sudden change in one or more of the attributes, for example (cf. step 210). The terminal may also collect and process the attributes in advance, prior to the sending of the set, i.e. steps 201 and/or 202 in FIG. 2*b* and steps 211 and/or 212 in FIG. 2*c* may be performed in advance in the background.

Figure 3:
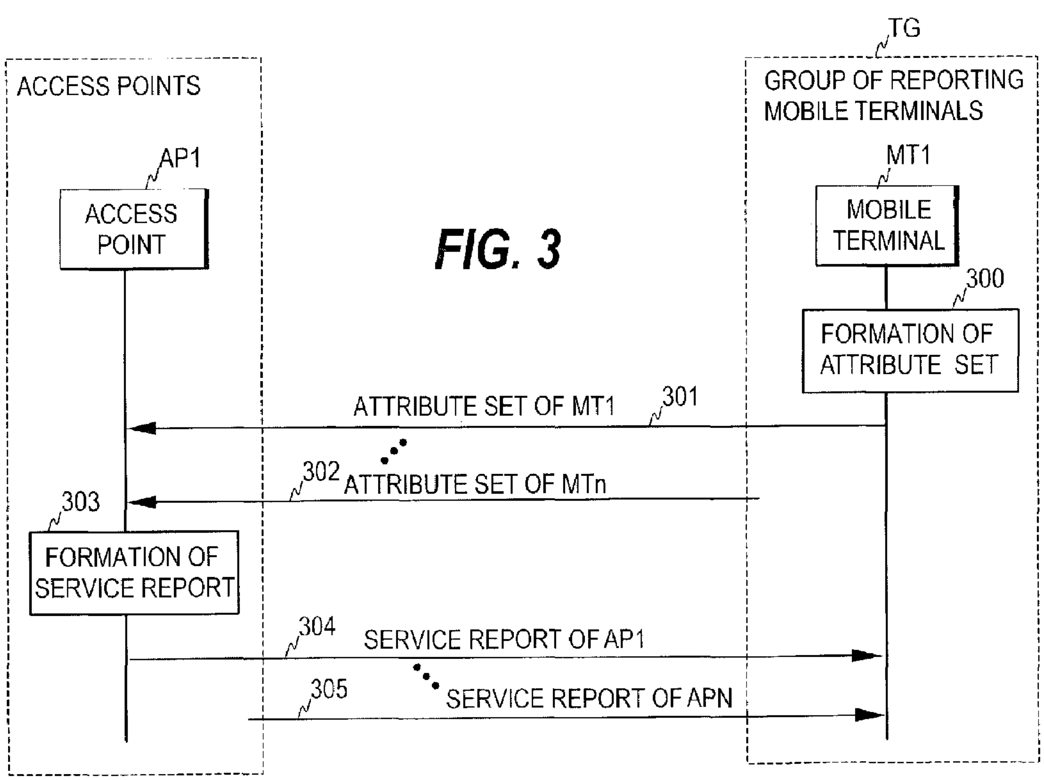
FIG. 3 illustrates the message exchange between the mobile terminals and the access points in the communication system of the invention.

FIG. 3 illustrates the basic operations according to the invention by showing one terminal MT1 and the access point AP1 serving it. The mobile terminal generates the above-described set (step 300), stores it, and sends a copy of the set to the serving access point (step 301). A plurality of other terminals associated with access point AP1 send similar sets. In other words, the mobile terminal shown in the figure belongs to a group TG of reporting terminals associated with access point AP1. Access point AP1 therefore receives a similar set from a plurality of mobile terminals (cf. step 302). As is obvious, a similar set here refers to a set with the same attributes but indicating terminal-specific attribute values. The sets can be transmitted in management frames, for example.

Although all terminals can act as reporting terminals, in one embodiment of the invention the terminals of a certain type form the group TG of reporting terminals. In this way this task can be given to terminals which have good performance in terms of battery power, such as laptops. However, even if the sets were sent only by certain terminals only, all terminals can utilize the results, as discussed below.

On the basis of the attribute sets received, the access point AP1 generates a cell or service report indicating the current service conditions in its cell (step 303). This typically involves calculation of various statistical values of said attributes, such as the average of each attribute received in the sets. Instead of an average, the access point may also determine the attribute values below which a certain proportion, such as half, of the reporting terminals are at the moment. For example, regarding the RSSI, the access point may calculate the average of the RSSIs of all reporting terminals or the RSSI value above which the current RSSI values of a certain proportion of the reporting terminals are. Different attributes may be subject to different type of calculations.

In one embodiment of the invention, the access point further monitors its own load level and determines an average load level over a predetermined period, such as over the last 5 minutes.

The access point then compiles a service report which includes at least some of the calculated variables. This service report preferably includes the calculated average load level and possibly also the instantaneous load level of the access point.

The service report is then transmitted (step 304) to at least one mobile terminal. The transmission can be a unicast transmission (such as a Probe Response), a broadcast transmission (in the beacon frame) or a multicast transmission. Moreover, as the neighboring access points also receive attribute sets from the terminals within their respective cell areas and as they send similar service reports (cf. step 305), an individual terminal, such as terminal MT1 shown in the figure, can typically receive service reports from a plurality of access points.

The above-described process is utilized when a mobile terminal joins the network. The terminal that enters the network or that is turned on in the network utilizes the service reports and selects the access point with the help of the service reports received. FIG. 4 is a flow chart illustrating the selection of an access point when a mobile terminal joins a network. When a mobile terminal enters a network or is turned on in the network, it starts to scan through the channels, using the above-described scanning methods, for example (step 400). In this way, the terminal receives the service reports from each of the access points available at the current location of the terminal. The terminal forms a set of the available access points and their respective attributes (step 401) and starts the process of selecting the best available access point.

It is assumed here that this selection process uses a key figure on which the selection is based. As discussed below, the key figure may simply be one of the attributes which is chosen as the primary attribute. In this example, the RSSI related to each access point link is chosen as the key figure/primary attribute, since the RSSI indicates which one of the access points is the best one, assuming that other factors affecting the quality of the service are substantially equal with respect to each of the access points. The terminal first examines the access point with the best RSSI value (step 402), i.e. the terminal starts the selection from the access point that hypothetically is the best one. However, the terminal then uses the information received in the service reports to verify whether this is the case. If the RSSI is not taken into account, the information received in the service reports indicates the general performance and interference levels in the neighborhood of the mobile terminal. This information is then used to verify whether the access point with the best RSSI can be selected. Each of the attributes is typically given a certain range indicating the values that are acceptable for the particular attribute. The terminal checks each attribute by comparing its value with the accepted values (step 403). If all attributes contained in the cell report are acceptable, the terminal associates with the access point in question (step 404). If the terminal notices that at least one of the attributes in the cell report is not acceptable, it starts to examine the service report of the access point with the next best RSSI (steps 406 and 403). In this way the terminal continues the examining of the access points in the order indicated by the RSSI value until an acceptable access point is found. If all the service reports received contain one or more unacceptable attributes, the terminal may continue scanning or may notify the user of the situation (step 407) and wait for user input. Depending on the selection by the user, the terminal may then continue scanning, stop searching for an access point without joining the network, or select the best access point available even though at least one of the attributes in the corresponding service report is not acceptable.

The above-described process can also be utilized in connection with roaming. In other words, when the terminal moves in the network, it can re-associate with an access point which is selected by means of the service reports in the above-described manner.

FIG. 5 illustrates the terminal elements in view of the invention. The mobile terminal MT comprises a transceiver Tx/Rx provided with at least one antenna, a control unit CPU, user interface means UI for creating a user interface, and memory means MEM, which may include one or more smart cards SC, such as a SIM card. However, as discussed above, a SIM card is not included in a traditional WLAN terminal.

The MIB attributes and the service reports are stored in the memory MEM of the terminal and the control unit performs the basic functions described above, i.e. the control unit retrieves the information from the memory, compiles the attribute set if the terminal is a reporting terminal, stores the service reports, and performs the selection of the access point. With the user interface means the control unit may inform the user of various events, if so desired. The control unit further controls the transceiver for scanning the channels and for establishing a connection to an access point.

FIG. 6 illustrates the elements of the access point. The access point comprises a transceiver unit 600, a control unit 601, memory means 602, user interface means 603, and a LAN interface for connecting the access point to the distribution system. As discussed above, this interface may be wireless although it is at present typically a wired one. The MIB attributes, the attribute sets received, and the service reports are stored in the memory means 602. The control unit performs the basic functions described above, i.e. the control unit processes the attribute sets received and generates the service reports. The control unit further monitors the load level of the access point and calculates the load attributes, such as the average load. The access point may be configured through the user interface means.

The service report may be generated in various ways, i.e. various statistical values based on the attribute sets can be determined. As the algorithm used in the terminal depends on the content of the service report, the algorithm may vary accordingly. Attribute values received from the terminals may also be used as such for the service reports. For example, the highest and/or lowest value of certain attribute may be inserted in the service report.

The selection of the access point by using the service reports may also be based on another primary attribute than the RSSI, such as the average load of the access point. Furthermore, a combination of service report attributes may be used to determine the order in which the access points are examined. In this connection, a key figure can be calculated or determined on the basis of the service report attributes used for each access point. Each attribute can be given a different weight for the calculation of the key figure. The key figures calculated may also directly determine the access point, whereby the validity of each service report attribute is not checked separately or only the critical attributes are checked. If the critical attributes are acceptable, the access point with the best key figure is selected. As discussed above, one of the attributes, such as the RSSI, may also form the key figure.

As indicated above, certain type of terminals can provide the access points with the information necessary for the functionality according to the invention. The terminals can be given an identifier, such as a bit value, which indicates whether the terminal belongs to the group of reporting terminals. In this way, the access point knows that certain mobile terminals do not send the attribute sets. In other words, the terminal can reject a report request without causing an error situation. Such terminals can be intelligent phones which have a lower battery capacity than laptop computers. For example, if the access point broadcasts a report request requesting the terminals to send their sets, the access point knows that a terminal returning a message with a certain bit value does not belong to the group.

If only some of the terminals act as the reporting terminals, all the terminals are not necessarily provided with the same functionalities. However, all the terminals according to the invention are provided with the functionalities for utilizing the service reports in the selection of the access point.

It was assumed in the above examples that all the available access points belong to the same sub-network (i.e. that the ESS identifier of the access points is the same). However, the mechanisms of the invention may equally well be used in an environment where the access points belong to different sub-networks. In this case the selection process may take the network into account, by favoring the access points in the currently serving network, for example.

An access point capable of operating according to at least two different WLAN standards or modes may indicate on one band that another band is also available. The attribute lists can be received and service reports sent on several or all frequency bands concerned and/or for the desired operating mode(s) of the access point. A terminal capable of using several bands/modes may scan one band while using another band. It is even possible that the access point indicates preferred modes/bands in the service report. This indication may simply be a bit string that the terminal is able to take into account. A terminal capable of using several bands/modes may thus select the access point based on the service reports of more than one band/mode. In the selection process, the access point can be given a certain additional weight depending on the value of the bit string. Alternatively, if the terminal notices that several access points in the neighborhood prefer the same band/mode, the terminal can make the selection based on the service reports relating to this band/mode only.

Furthermore, various scanning mechanisms can be used for obtaining the service reports. The channels of the neighboring access points can be stored at each access point, which may then inform the said channels in the beacon frame or in the Probe Request. In this way the terminals can be notified of the channels to be scanned, whereby the scanning and selection processes can be accelerated, and the power consumption of the terminals reduced.

The access points may also exchange their service reports through the Distribution System, whereby one access point can utilize the service reports of the neighboring access points and add various information about one or more other access points in its service report. In this way, the service reports can carry various priority orders, for example, in order to further accelerate the selection process.

Although the invention was described above with reference to the examples shown in the appended drawings, it is obvious that the invention is not limited to these, but may be modified by those skilled in the art without departing from the scope and spirit of the invention. For example, the invention is not restricted to WLAN networks according to the IEEE 802.11 standard only, but can be used in connection with other wireless system, such as systems based on the BRAN (Broadband Radio Access Networks) standard.

What is claimed is:

1. A method for selecting an access point in a wireless communication system comprising mobile terminals and access points, each access point being capable of serving the mobile terminals within a service area of the access point, the method comprising the steps of:

sending at least one set of attributes from a first group of mobile terminals to the access point currently serving said group of mobile terminals, each of said mobile terminals sending a set that contains at least one attribute indicating the quality of a wireless link between the serving access point and the mobile terminal;

based on the sets, forming a service report describing current service conditions in the service area of the access point;

transmitting the service report to a second group of mobile terminals;

in a mobile terminal belonging to said second group, examining at least one service report received; and in response to the examining step, selecting the access point to which a wireless link is to be established from said mobile terminal.

2. A method according to claim 1, wherein the sets contain the same attributes.

3. A method according to claim 1, wherein the first group contains mobile terminals of a predetermined type.

4. A method according to claim 1, wherein the forming step includes the steps of (a) calculating the average load level of the access point over a preceding time period of a predetermined length and (b) inserting the average load level calculated into the service report.

5. A method according to claim 1, wherein the transmitting step includes broadcasting the service report from the access point.

6. A method according to claim 1, wherein the transmitting step includes sending the service report to a mobile terminal in response to a predetermined request received from said mobile terminal.

7. A method according to claim 1, wherein the examining step includes the steps of (a) choosing an access point based on at least one predetermined attribute and (b) checking the service report of said access point, and the selecting step includes selecting said access point if the checking step indicates that the service report is acceptable.

8. A method according to claim 1, wherein said at least one predetermined attribute indicates the level of the signal received from the access point.

9. A method according to claim 2, wherein the forming step includes the steps of (a) calculating averages for at least some of the attributes received in the sets and (b) inserting the averages calculated in the service report.

10. A method according to claim 1, further comprising the step of retrieving the attributes from a management information base within the MAC layer of a mobile terminal belonging to said first group.

11. A method according to claim 1, wherein the forming step includes inserting into the service report information about at least one other access point.

12. A method according to claim 11, wherein said information includes data concerning the wireless links used by said at least one other access point.

13. A method according to claim 3, wherein the mobile terminals belonging to the first group are assigned an identifier by means of which said terminals can be identified from other terminals.

14. A wireless communication system comprising mobile terminals and access points, each access point being capable of serving the mobile terminals within a service area of the access point, the system comprising:

reception means for receiving at least one set of attributes from a first group of mobile terminals, at least one of the attributes to indicate the quality of a wireless link between a particular mobile station and the access point serving said mobile station;

processing means for forming, based on the sets, a service report describing current service conditions in the service area of the access point;

transmission means for transmitting the service report to a second group of mobile terminals; and in each of the mobile terminals in said second group, (a) examination means for examining a service report received and (b) selection means, responsive to the examination means, for selecting the access point with which a wireless link is to be established.

15. An access point for a wireless communication system, the access point comprising:

interface means for connecting the access point to a distribution system;

a transceiver for communicating wirelessly with mobile terminals located within a service area of the access point, said transceiver being adapted to receive sets of attributes from the mobile terminals, at least one of the attributes to indicate the quality of a wireless link between the serving access point and the respective mobile terminal;

processing means for forming, based on the sets, a service report describing current service conditions in the service area of the access point;

wherein the transceiver is further adapted to transmit the service report to at least one mobile terminal.

16. A mobile terminal for a wireless communication system, the mobile terminal comprising:

a transceiver for communicating with an access point of the wireless communication system via a wireless link;

memory means for storing attributes relating to said link;

collection means for collecting service reports from available access points, each service report describing current service conditions within a service area of a particular access point;

examination means for examining the service report received by the mobile terminal;

selection means, responsive to the examination means, for selecting the access point; and access means for establishing a wireless link with the access point selected.

17. A mobile terminal according to claim 16, further comprising data collection means for retrieving predetermined attributes from the memory, at least one of the attributes to indicate the quality of a wireless link between the serving access point and the respective mobile terminal;

wherein the transceiver is adapted to send the retrieved attributes to an access point.

18. A mobile terminal according to claim 16, wherein the mobile terminal is a mobile phone.

19. A mobile terminal according to claim 17, wherein the mobile terminal is a laptop computer.

* * * * *